US010784756B2

(12) United States Patent
Nagy et al.

(10) Patent No.: US 10,784,756 B2
(45) Date of Patent: Sep. 22, 2020

(54) ELECTRIC MACHINE WITH PRESS-FIT ELECTRONICS PACKAGE

(71) Applicant: BorgWarner Inc., Auburn Hills, MI (US)

(72) Inventors: Attila Nagy, Fishers, IN (US); Bruce Hamilton, Noblesville, IN (US)

(73) Assignee: BorgWarner Inc., Auburn Hills, MI (US)

( * ) Notice: Subject to any disclaimer, the term of this patent is extended or adjusted under 35 U.S.C. 154(b) by 377 days.

(21) Appl. No.: 15/854,862

(22) Filed: Dec. 27, 2017

(65) Prior Publication Data

US 2018/0219462 A1 Aug. 2, 2018

Related U.S. Application Data

(60) Provisional application No. 62/453,665, filed on Feb. 2, 2017.

(51) Int. Cl.
| | | |
|---|---|---|
| *H02K 15/14* | (2006.01) | |
| *H02K 15/02* | (2006.01) | |
| *H02K 11/05* | (2016.01) | |

(52) U.S. Cl.
CPC ............ *H02K 15/14* (2013.01); *H02K 11/05* (2016.01)

(58) Field of Classification Search
CPC ............................... H02K 15/14; H02K 11/05
(Continued)

(56) References Cited

U.S. PATENT DOCUMENTS 3,292,135 A * 12/1966 Robinson ................. H05K 7/12
439/332
4,941,069 A 7/1990 Danenberg et al.
(Continued)

FOREIGN PATENT DOCUMENTS

| JP | 2007166857 A | 6/2007 |
|---|---|---|
| JP | 2016058594 A | 4/2016 |
| KR | 20130041625 A | 4/2013 |

OTHER PUBLICATIONS

International Search Report and Written Opinion of the International Searching Authority, PCT/US2017/068472, dated Apr. 23, 2018, 9 pages.

*Primary Examiner* — Peter Dungba Vo
*Assistant Examiner* — Kaying Kue
(74) *Attorney, Agent, or Firm* — Bose McKinney & Evans LLP

(57) ABSTRACT

An electric machine having a housing assembly and a stator assembly coupled with a rotor assembly. A plurality of MOSFET assemblies are operably coupled with the stator assembly. The MOSFET assemblies are disposed in openings defined by the housing assembly and include a carrier that is secured within the openings with a press-fit engagement. The carrier defines an interior space extending the full longitudinal length of the carrier and includes at least one planar mounting surface wherein a MOSFET is mounted on the planar mounting surface. In some embodiments, the housing assembly includes an aluminum heat exchange member that defines an opening in which a MOSFET assembly is installed. The carrier may be formed by extruding copper and include longitudinally extending ribs that engage the housing assembly in press fit engagement. A method of manufacturing an electric machine is also disclosed.

20 Claims, 19 Drawing Sheets

(58) Field of Classification Search
USPC .... 29/597, 598, 596, 732–736, 832, 603.04, 29/602.1
See application file for complete search history.

(56) References Cited

U.S. PATENT DOCUMENTS

| | | | | |
|---|---|---|---|---|
| 5,075,616 A | * | 12/1991 | Mitsui | F02N 11/04 |
| | | | | 290/38 R |
| 5,132,604 A | * | 7/1992 | Shimane | F02N 11/04 |
| | | | | 290/46 |
| 5,543,703 A | * | 8/1996 | Kusase | H01L 29/7803 |
| | | | | 322/16 |
| 5,677,616 A | * | 10/1997 | Ooiwa | H01L 25/112 |
| | | | | 257/E25.025 |
| 5,694,313 A | * | 12/1997 | Ooiwa | H02K 11/046 |
| | | | | 363/145 |
| 5,719,487 A | * | 2/1998 | Sato | H01L 29/7813 |
| | | | | 322/28 |
| 5,742,498 A | | 4/1998 | Taniguchi et al. | |
| 6,081,054 A | | 6/2000 | Kashihara et al. | |
| 6,100,613 A | | 8/2000 | Tanaka et al. | |
| 6,310,791 B1 | | 10/2001 | Lin | |
| 6,366,060 B1 | | 4/2002 | Ely et al. | |
| 6,538,352 B2 | * | 3/2003 | Asao | H02K 5/141 |
| | | | | 310/58 |
| 7,227,340 B2 | | 6/2007 | Chen | |
| 7,411,324 B2 | * | 8/2008 | Kusumi | H02K 11/048 |
| | | | | 310/68 D |
| 8,106,547 B2 | * | 1/2012 | Inokuchi | H02K 11/048 |
| | | | | 310/68 D |
| 8,790,520 B2 | * | 7/2014 | Hall | H05K 3/4046 |
| | | | | 216/8 |
| 2010/0327678 A1 | * | 12/2010 | Yamasaki | H02K 11/33 |
| | | | | 310/64 |
| 2014/0246177 A1 | * | 9/2014 | Chamberlin | H02K 9/19 |
| | | | | 165/104.33 |
| 2016/0006322 A1 | | 1/2016 | De Filippis | |
| 2016/0072376 A1 | * | 3/2016 | Ahlers | H01L 27/0733 |
| | | | | 310/68 D |
| 2016/0104658 A1 | | 4/2016 | Bradfield | |
| 2016/0105082 A1 | * | 4/2016 | Bradfield | H02K 9/06 |
| | | | | 310/54 |

\* cited by examiner

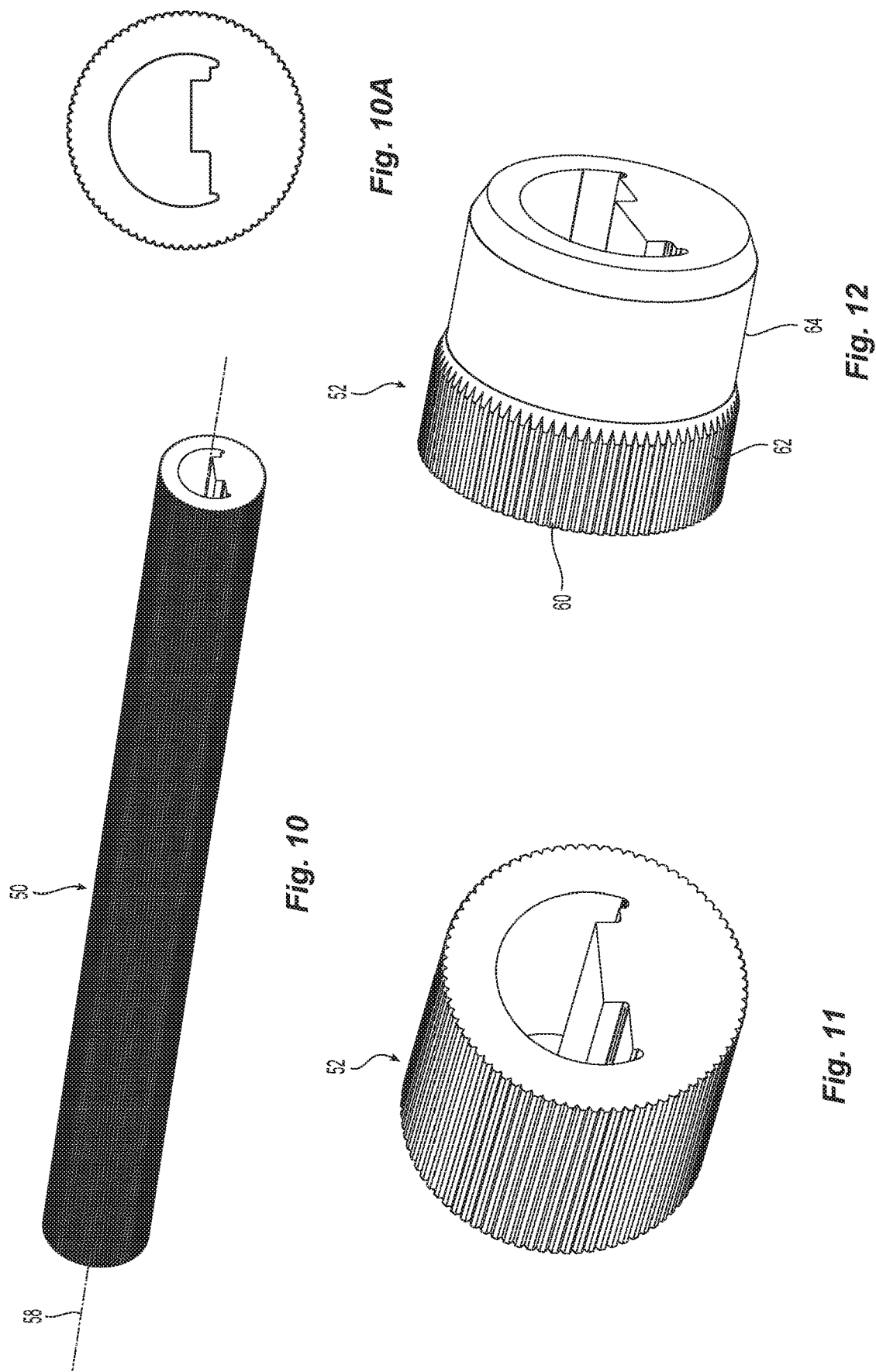

ELECTRIC MACHINE WITH PRESS-FIT ELECTRONICS PACKAGE

CROSS REFERENCE TO RELATED APPLICATIONS

This application claims priority under 35 U.S.C. 119(e) of U.S. provisional patent application Ser. No. 62/453,665 filed on Feb. 2, 2017 entitled ELECTRIC MACHINE WITH PRESS-FIT ELECTRONICS PACKAGE the disclosure of which is hereby incorporated herein by reference.

BACKGROUND

1. Technical Field

The present invention relates to electric machines and, more particularly, to mounting assemblies for electronic components.

2. Description of the Related Art

Electric machines used for alternators in vehicles are often three phase electric machines that utilize diodes to convert, or rectify, the alternating current generated by the alternator to direct current. Some newer alternator designs have replaced the diodes with metal—oxide—semiconductor field-effect transistors (MOSFETs) to rectify the alternating current generated by the alternator.

The use of MOSFETs can provide greater efficiency in operation of the alternator. The various structural components of an alternator adapted to use diodes, however, generally must be redesigned to accommodate the use of a MOSFET which can present difficulties and enhanced expenses when converting a diode alternator design for use with MOSFETs.

SUMMARY

The present invention provides a packaging assembly for a MOSFET that facilitates its incorporation in an electric machine originally designed to accept diodes. It may, however, also be used with electric machines specifically designed for use with MOSFETs.

The invention comprises, in one form thereof, an electric machine that includes a housing assembly; a stator assembly and a rotor assembly operably coupled together and coupled with the housing assembly; a plurality of MOSFET assemblies operably coupled with the stator assembly; and wherein the MOSFET assemblies are each disposed in an opening defined by the housing assembly and include a carrier with an exterior having a shape whereby the carrier is secured within one of the openings defined by the housing assembly with a press-fit engagement; the carrier defining an interior space extending the full longitudinal length of the carrier and including at least one planar mounting surface wherein a MOSFET is mounted on the planar mounting surface.

In some embodiments, the carrier defines a longitudinal axis extending the length of the carrier and the carrier defines a cross sectional profile taken in a plane perpendicular to the longitudinal axis that remains substantially constant along the length of the carrier. The carrier may be formed out of copper. In such an embodiment, the planar mounting surface may be arranged parallel with the longitudinal axis of the carrier and the longitudinal axis of the carrier may be positioned parallel with the rotational axis of the rotor.

The carrier may include a plurality of longitudinally extending ribs on the exterior surface of the carrier wherein the longitudinally extending ribs engage the housing assembly within the opening to form the press-fit engagement.

The housing assembly may include at least one heat exchange member defining a plurality of heat exchange fins and also defining at least one of the openings for receiving the MOSFET assemblies. In some embodiments, the at least one heat exchange member is formed out of aluminum and the carrier is formed out of copper.

In some embodiments, the MOSFET is coupled with a gate arrangement including a plurality of conductive traces wherein a plurality of wire bonds connect the MOSFET to the plurality of conductive traces. The gate arrangement can be secured to the planar mounting surface to thereby mount the MOSFET to the planar mounting surface.

The openings in which the MOSFET assemblies are installed may take the form of cylindrical openings.

The electric machine may also include a bus bar assembly conductively coupled with the plurality of MOSFET assemblies.

The invention comprises, in another form thereof, a method of manufacturing an electric machine that includes operably coupling a stator assembly with a rotor assembly; coupling the stator assembly and rotor assembly with a housing assembly; forming a plurality of openings in the housing assembly; forming a plurality of carriers, each carrier being formed out of a profile wherein the carrier defines an interior space extending the longitudinal length of the carrier and wherein the interior space includes a planar mounting surface; mounting a MOSFET on the planar mounting surface of each carrier; installing each carrier in one of the openings in the housing assembly with a press-fit engagement; and operably coupling the MOSFET with the electric machine.

In some embodiments, the profile is formed out of a copper material.

In some embodiments of the method the profile is formed by extruding a material and cutting the profile to a desired length to form individual carriers. In such an embodiment, the profile may be formed by extruding a copper material. The profile may also define a cross sectional shape in a plane perpendicular to the longitudinal axis that remains substantially constant along the length of the profile.

In some embodiments, the method further includes coupling each MOSFET with a gate arrangement prior to mounting the MOSFET on the planar mounting surface. The method may additionally include securing the gate arrangement to the planar mounting surface of the carrier to thereby mount the MOSFET on the planar mounting surface. Some embodiments may still further include mounting the MOSFET on the gate arrangement and coupling the MOSFET with the gate arrangement with a plurality of wire bonds prior to securing the gate arrangement to the planar mounting surface of the carrier.

In some embodiments, the profile defines an exterior surface having longitudinally extending ribs and the step of installing the carrier in one of the openings in the housing assembly with a press-fit engagement includes engaging the longitudinally extending ribs with the housing assembly to form the press-fit engagement.

In some embodiments, the housing assembly includes at least one heat exchange member defining a plurality of heat exchange fins and at least one of the openings and the step of installing the carrier in one of the openings in the housing assembly with a press-fit engagement includes installing the carrier in the at least one heat exchange member. In such embodiments, the carrier may be formed out of copper with the heat exchange member being formed out of aluminum.

In some embodiments, the method includes the step of installing a bus bar assembly on the electric machine and coupling the MOSFET with the bus bar assembly.

In some embodiments, the step of forming a plurality of openings in the housing assembly comprises forming a plurality of cylindrical openings.

The invention comprises, in yet another form thereof, a method of manufacturing an electric machine that includes operably coupling a stator assembly with a rotor assembly, the rotor assembly defining a rotational axis; coupling the stator assembly and rotor assembly with a housing assembly; forming a plurality of openings in the housing assembly; forming a plurality of carriers, each carrier being formed out of a profile wherein the carrier defines a longitudinal axis and an interior space extending the longitudinal length of the carrier and wherein the interior space includes a planar mounting surface disposed parallel with the longitudinal axis; mounting a MOSFET on the planar mounting surface of each carrier; installing each carrier in one of the openings in the housing assembly with a press-fit engagement wherein the longitudinal axis of each carrier is parallel with the rotational axis of the rotor assembly; and operably coupling the MOSFET with the electric machine.

In some embodiments of the method, the profile is formed by extruding a material and the method further includes the step of cutting the profile to a desired length to form individual carriers.

The method may also include coupling each MOSFET with a gate arrangement prior to mounting the MOSFET on the planar mounting surface. Coupling each MOSFET with a gate arrangement may include mounting each MOSFET on a gate arrangement and also include coupling each MOSFET with a corresponding one of the gate arrangements with a plurality of wire bonds prior to securing the gate arrangement on the planar mounting surface.

The invention comprises, in still another form thereof, a method of manufacturing an electric machine that includes operably coupling a stator assembly with a rotor assembly; coupling the stator assembly and rotor assembly with a housing assembly; forming a plurality of openings in the housing assembly; forming a profile by extruding a material, the profile defining an interior space extending the longitudinal length of the profile and wherein the interior space includes a planar mounting surface; cutting the profile to a desired length to form a plurality of carriers; mounting each one of a plurality of MOSFETs on a gate arrangement; mounting one of the plurality of MOSFETs on the planar mounting surface of each of the carriers after mounting the plurality of MOSFETs on the gate arrangements; installing each carrier in one of the openings in the housing assembly with a press-fit engagement; and operably coupling the MOSFET with the electric machine.

In some embodiments of the method, the profile is formed by extruding a copper material.

The method may also include securing each of the gate arrangements to the planar mounting surface of one of the carriers to thereby mount the MOSFETs on the planar mounting surfaces. It may additionally include coupling each of the MOSFETs with a corresponding one of the gate arrangements with a plurality of wire bonds prior to securing the gate arrangement to the planar mounting surface of one of the carriers.

It is additionally noted that the different features described above and in the detailed description may be provided in different combinations than those explicitly described herein and such different combinations are within the scope of the present disclosure.

It is also noted that, as used herein, the terms such as couple, mount, secure, support, attach, and grammatical variations thereof do not require that the two parts which are coupled, mounted, secured, supported or attached together be in direct contact unless such direct contact is specifically described as being necessary.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein:

FIG. 10 is a perspective view of an extrusion.

FIG. 10A is an end view showing the profile of the extrusion.

FIG. 11 is a perspective view of a portion of the extrusion after it has been cut to the desired length.

FIG. 12 is a perspective view showing the extrusion after a portion of the exterior surface has been machined.

Figure 1:
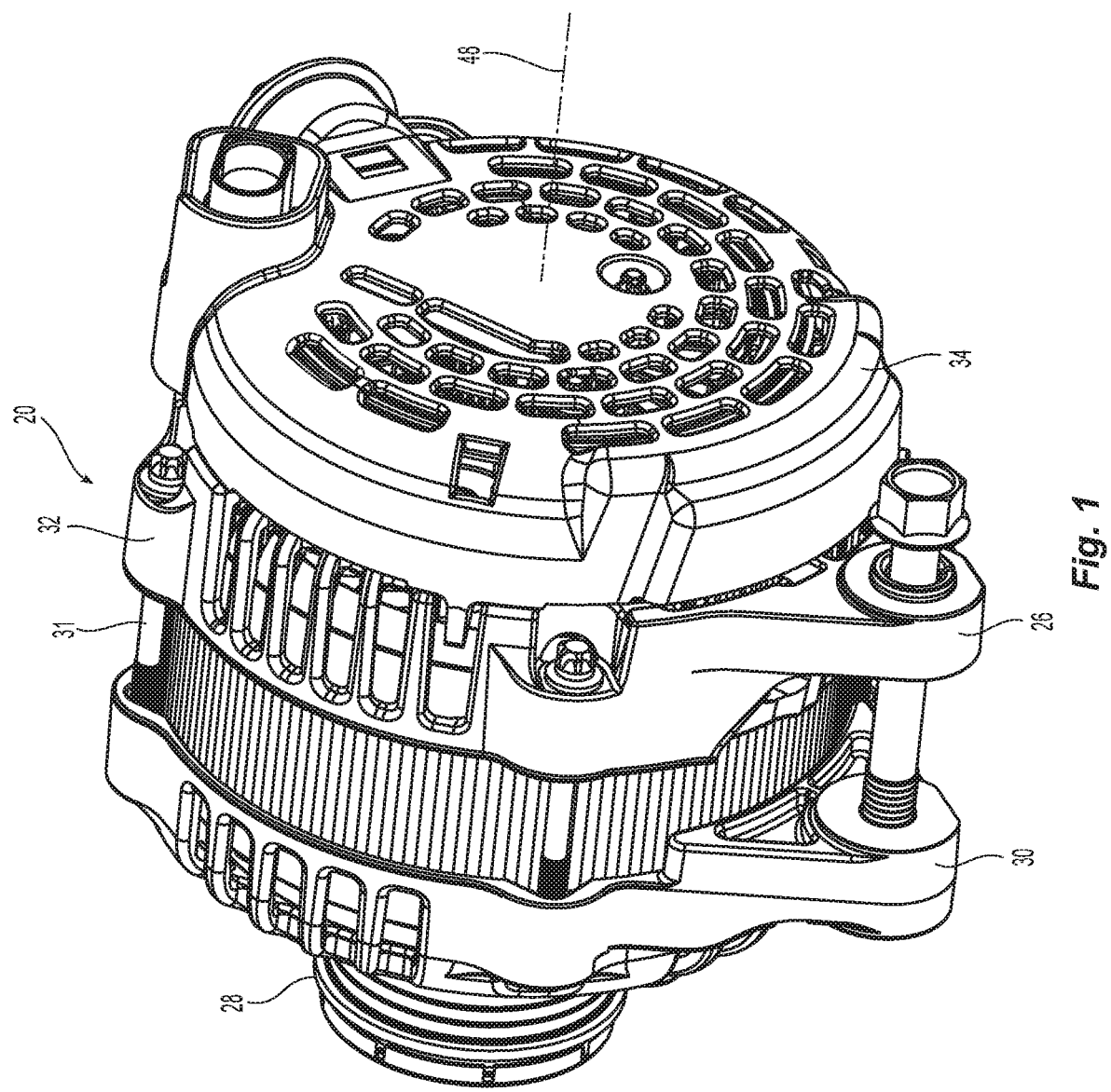
FIG. 1 is a perspective view of an electric machine.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION

An electric machine 20 is shown in FIG. 1. Electric machine 20 includes a stator assembly 22 operably coupled with a rotor assembly 24 (FIG. 6) and a housing assembly 26. Housing assembly 26 supports the stator assembly 22 and rotor assembly 24 and facilitates the mounting of the electric machine. In the illustrated embodiment, electric machine 20 is a vehicle alternator and the rotor assembly 24 is mechanically coupled with the engine of the vehicle with a belt that engages belt pulley 28. As can be seen in FIG. 1, housing assembly 26 includes first and second members 30, 32 secured together with bolts 31 and an end cover 34 opposite belt pulley 28.

Figure 2:
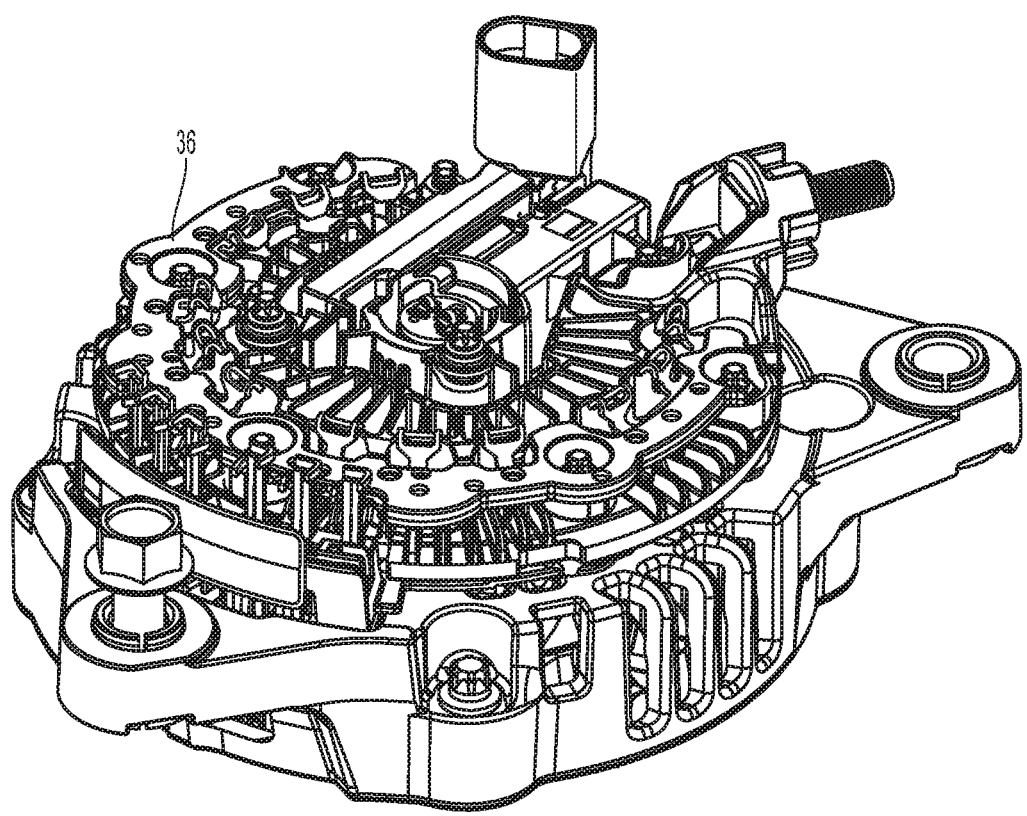
FIG. 2 is a perspective view of a partially disassembled electric machine.
Figure 5:
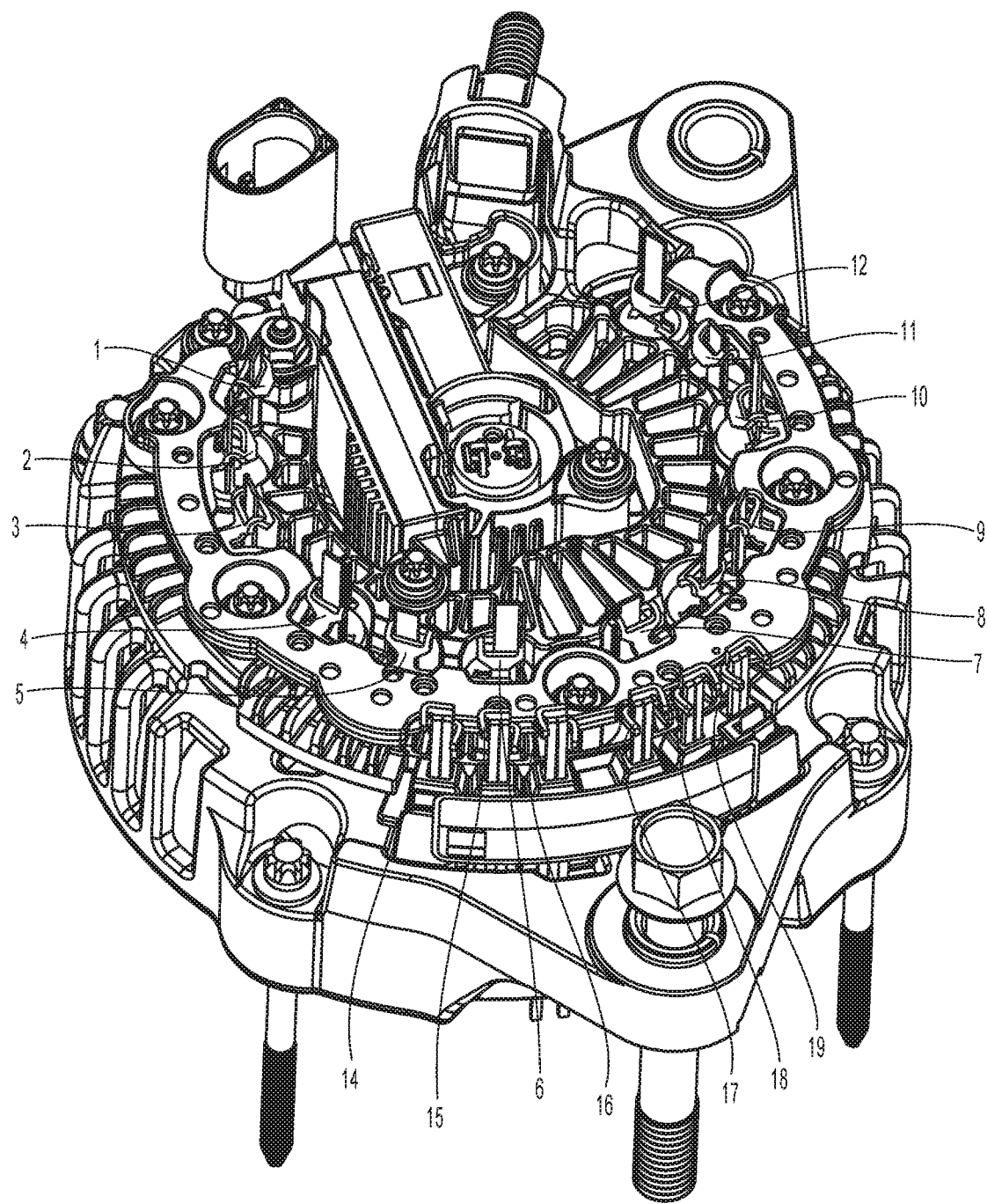
FIG. 5 is a perspective view of an electric machine having a bus bar.

FIG. 2 illustrates electric machine 20 with end cover 34 removed. Bus bar assembly 36 is shown in FIG. 2 and is used to provide electrical connections between the stator windings and the MOSFETs. In the illustrated embodiment, bus bar assembly 36 includes conductive members that are overmolded with an electrically insulative material which insulates the conductive members from each other and external parts. Bus bar assembly 36 also includes a plurality of connectors that extend outwardly for conductively coupling one of the conductive members with an external lead. For example, the connectors labeled 1-12 in FIG. 5 are connected with a lead extending from a MOSFET. Connectors labeled 14-19 are connected with stator winding leads. Bus bar assembly 36 may also include additional connectors as appropriate. For example, a thirteenth connector (not shown) may be provided to connect with an external ground, control device, regulator or other circuit.

Figure 6:
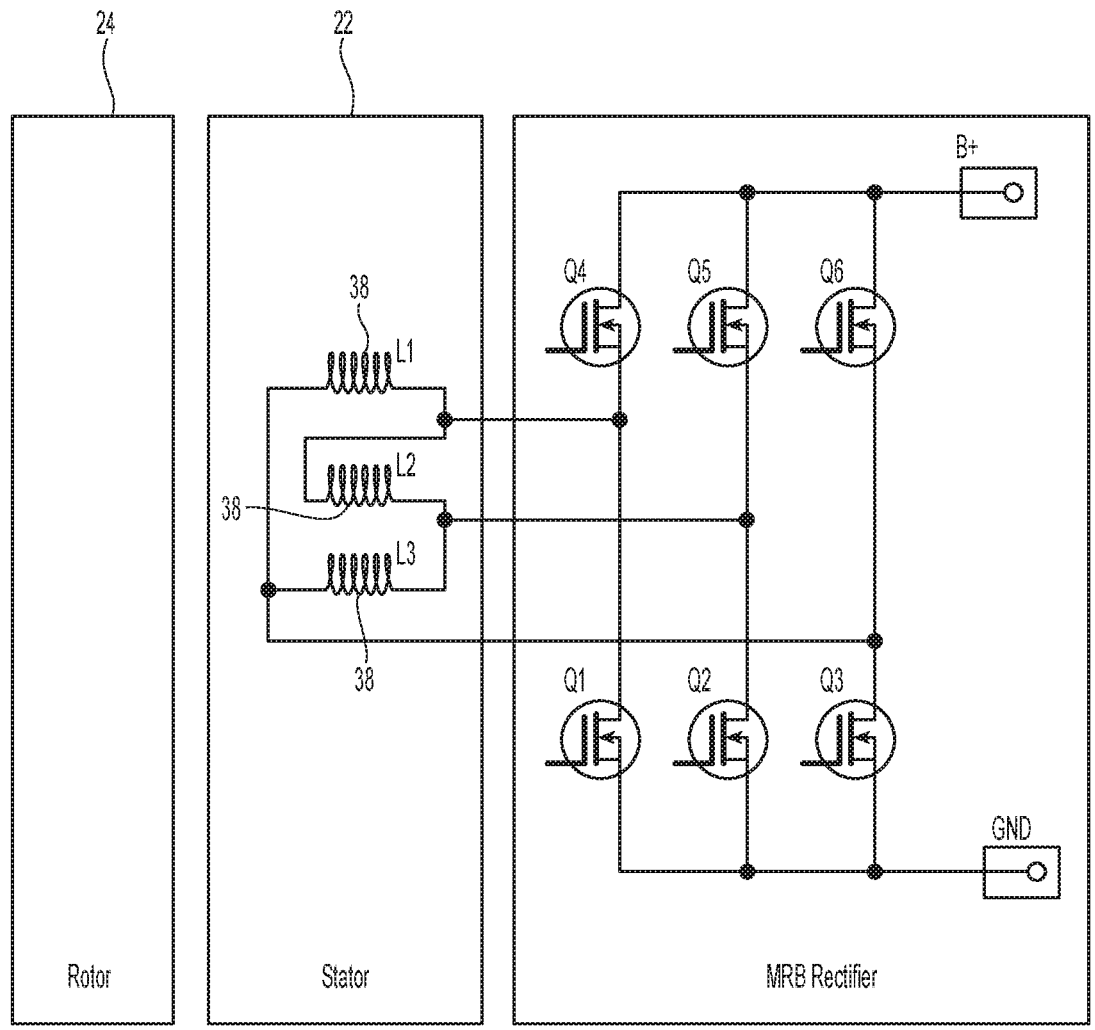
FIG. 6 is a schematic diagram of a three phase alternator with MOSFETs.
Figure 7:
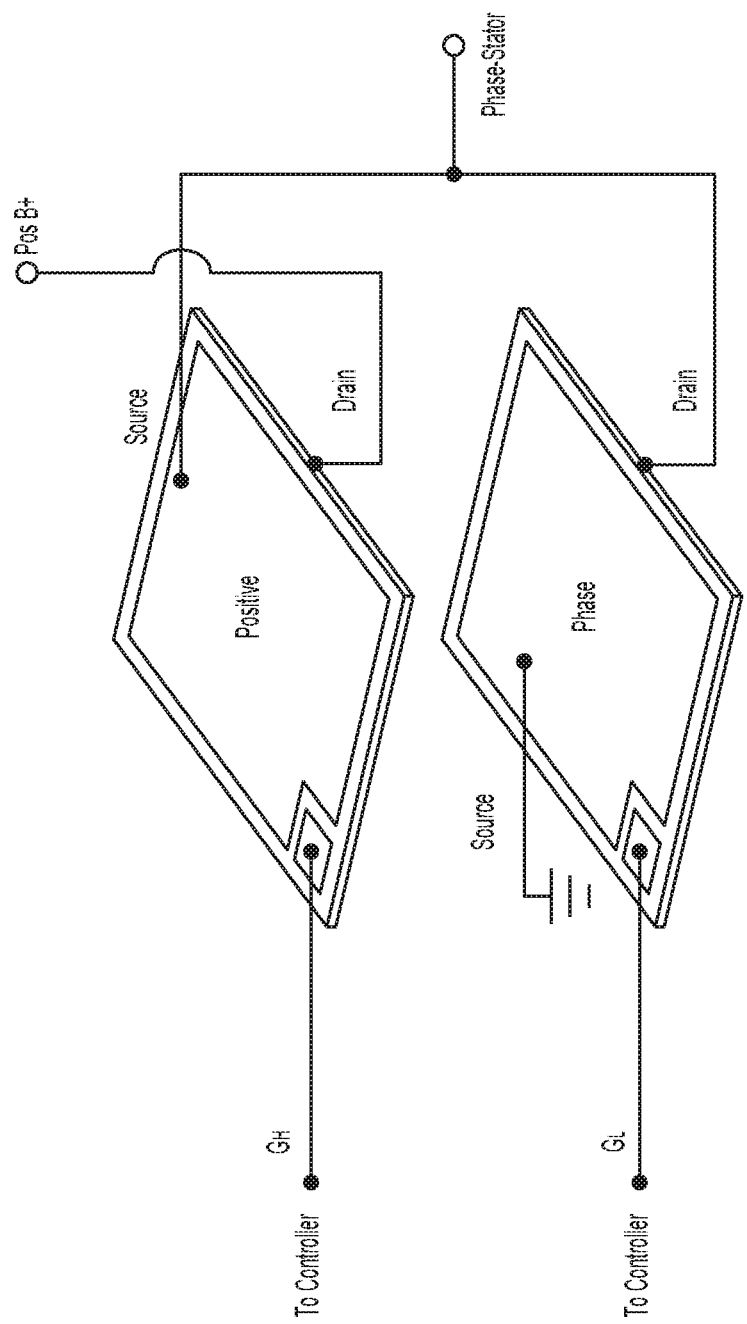
FIG. 7 is a schematic diagram of the connections for one phase of the electric machine of FIG. 6.
Figure 8:
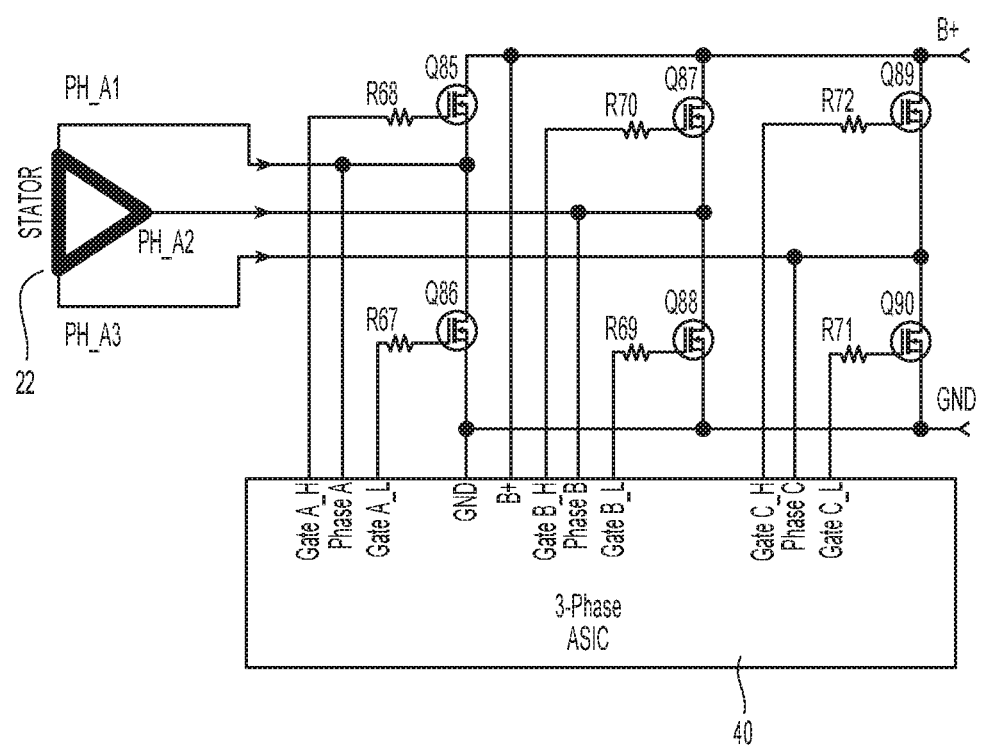
FIG. 8 is a schematic diagram illustrating the control of a MOSFET rectifier for a three phase alternator.

FIG. 6 is a schematic diagram showing the basic layout of an alternator having a stator assembly 22 operably coupled with a rotor assembly 24 to form a three phase electric machine having a MOSFET rectifier. As can be seen in FIG. 6, each phase is connected with a pair of MOSFETs, with one of the MOSFETs being coupled to the battery and the other MOSFET being coupled with a ground. The individual MOSFETs have three connections, one to either the battery or ground, a second one to a stator winding and a third connection that is coupled with a controller or similar device which controls the opening and closing of the MOSFETs. The layout shown in FIG. 6 is a conventional layout for a three phase alternator utilizing MOSFETs. FIG. 7 provides a schematic illustration of one pair of MOSFETs that are connected with one of the stator phases or windings 38. FIG. 8 is similar to FIG. 6 but provides greater detail and also shows the connection between controller 40 and the MOSFETs.

Figure 9:
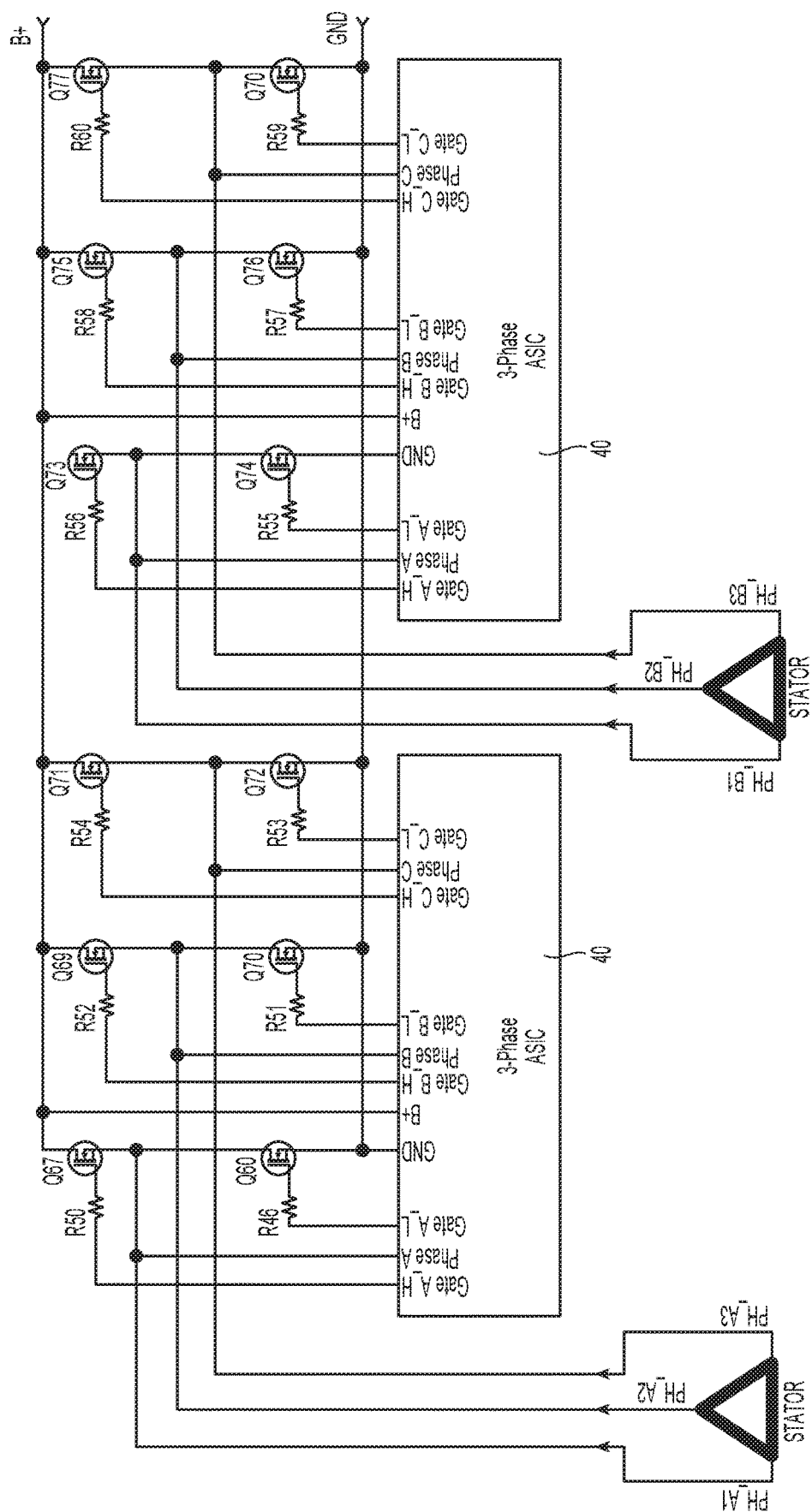
FIG. 9 is a schematic diagram illustrating the three-phase control of a MOSFET rectifier for an alternator having six windings.

FIG. 9 illustrates an alternative layout for an alternator. In this layout, the stator includes six phases which are operated using a three phase control implementation. A first set of three phases are connected with a first controller and a second set of three phases are connected with a second controller. This layout includes twelve rectifier positions and corresponds to the alternator depicted in FIGS. 2 and 5. To minimize instantaneous power, two phases having a 30 degree shift should not be connected to the same controller. In the illustrated layout, each rectifier position is shown having a single MOSFET, however, alternative designs could be employed utilizing a plurality of power MOSFETs arranged in parallel at each rectifier position.

Figure 3:
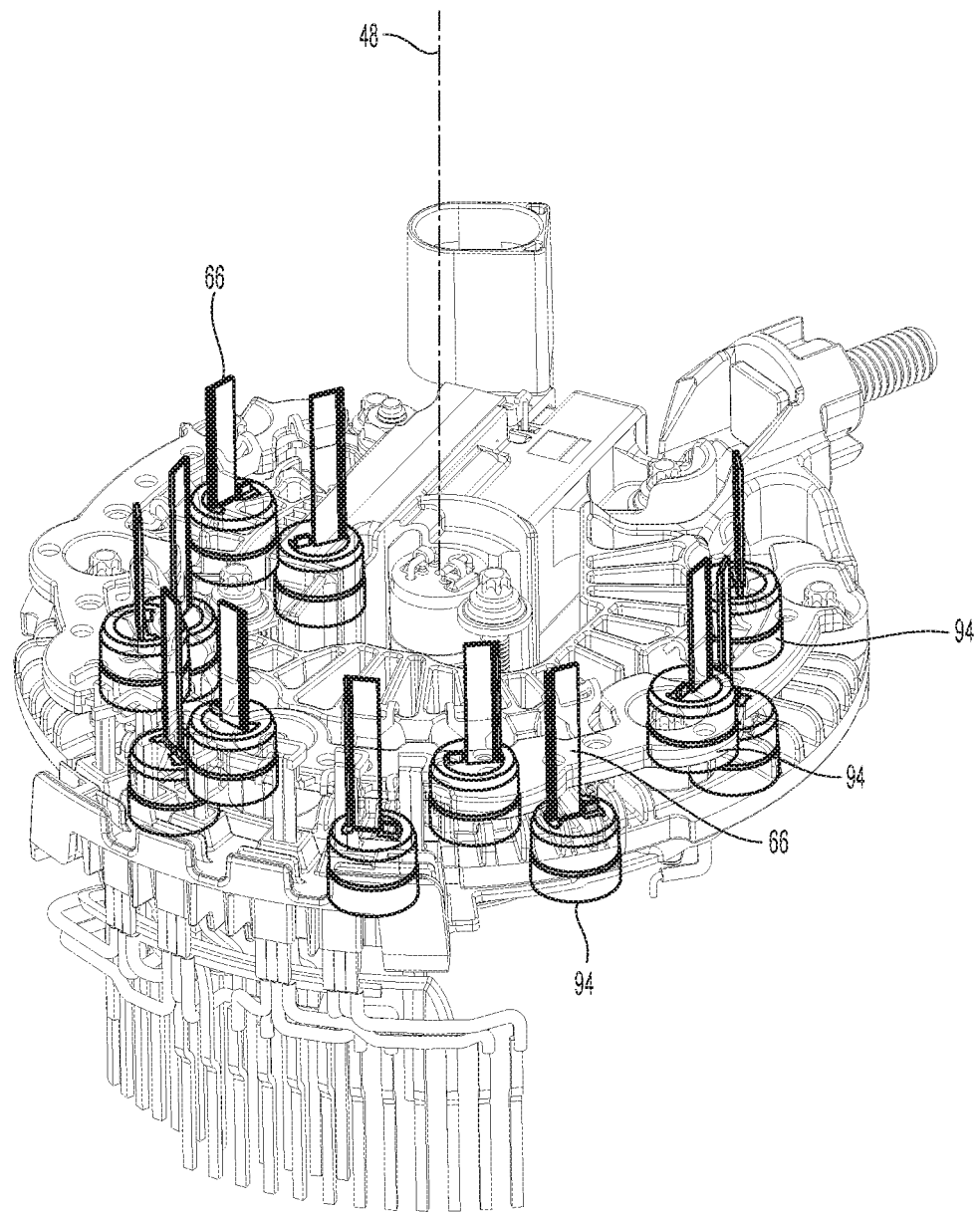
FIG. 3 is a view of an electric machine showing the location of the MOSFET carriers.
Figure 4:
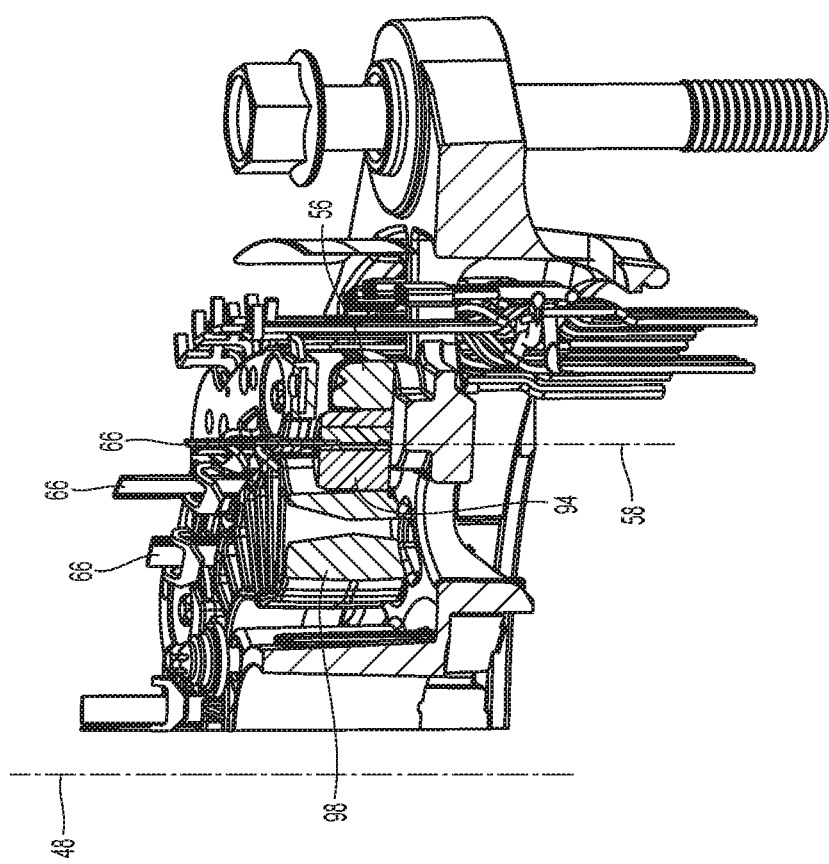
FIG. 4 is a cut away perspective view of an electric machine showing the location of the MOSFET carriers.

FIGS. 3 and 4 show the location of the MOSFET assemblies 94 in electric machine 20. As can be seen in these figures, conductive traces 66 extending from MOSFET assemblies 94 are electrically connected to a bus bar assembly. MOSFET assemblies 94 are mounted in cylindrical openings in a housing member 56 which also includes heat dissipating fins 94. Rotor assembly 24 defines a rotational axis 48 and the individual longitudinal axes 58 of each of the MOSFET assemblies 94 are arranged parallel with rotor rotational axis 48. As will be discussed further below, the planar mounting surface 90 of each of the MOSFET carriers 52 is arranged parallel with longitudinal axis 58 and, thus, also with rotor rotational axis 48 in the illustrated embodiment. While this arrangement allows for efficient manufacture, alternative configurations may also be employed.

As further discussed below, electric machine 20 utilizes MOSFET assemblies 94 having a carrier 52 that allows the MOSFET assemblies 94 to be mounted in a cylindrical opening 54 in a housing member 56. This arrangement not only provides an efficient means for securing the MOSFET assembly in the electric machine, but also allows existing alternator designs employing diodes to be more easily adapted for use with MOSFETs by reducing the number of parts of such pre-existing designs that need to be modified. A further, and significant, advantage of the MOSFET assemblies 94 described herein is that it provides a carrier assembly that can be press-fit into an alternator housing member without subjecting the MOSFET/carrier interface to high stresses that might damage or destroy the functionality of the MOSFET or its various electrical connections while also providing a robust thermal pathway between the MOSFET and the housing member in which the carrier is mounted.

The manufacture of carrier 52 is best understood with reference to FIGS. 10-12. Carrier 52 is advantageously made by forming an extrusion 50 as shown in FIG. 10. The extrusion, also referred to as a profile herein, may be formed out of copper which provides good thermal conductivity. The use of copper also allows carrier 52 to be used to form an electrical connection. The extrusion 50, and resulting carrier 52, defines a cross sectional profile taken in a plane perpendicular to the longitudinal axis 58 that remains substantially constant along the length of the carrier 52. The cross sectional profile of carrier 52 taken in a plane perpendicular to the longitudinal axis 58 is shown in FIG. 10A.

After forming extrusion 50, extrusion/profile 50 is cut to length to form a plurality of carriers 52. FIG. 11 shows a carrier 52 after it has been cut to length. In the illustrated embodiment, the exterior surface 60 of extrusion 50 includes a plurality of longitudinally extending ribs 62. A portion of the exterior surface 60 of carrier 52 is machined as depicted in FIG. 12 to form a connector plug surface 64 having a generally cylindrical surface with a beveled edge. When press-fitting carrier 52 into an opening, that portion of carrier 52 having ribs 62 is inserted into the opening leaving connector plug surface 64 projecting outwardly. The use of ribs 62 allows for slightly looser tolerances when forming the opening into which carrier 52 is inserted and controlling the outside diameter of carrier 52. The connector plug surface 64 provides an interface for mounting an electrical connector that will engage leads projecting from a MOSFET mounted within carrier 52.

Figure 13:
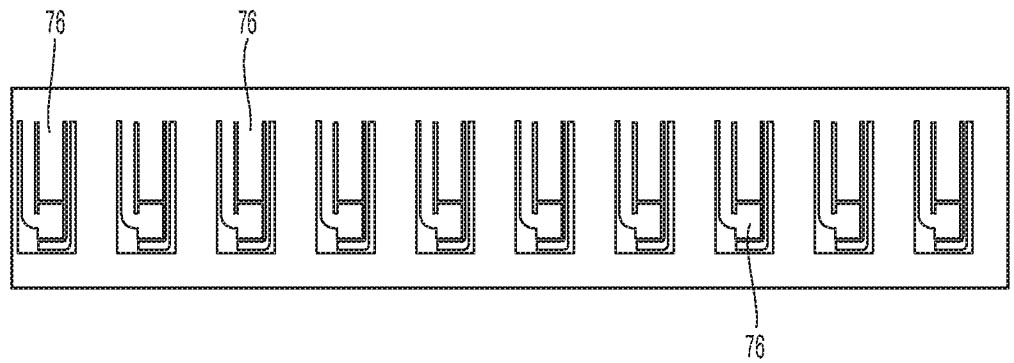
FIG. 13 is a top view of a lead frame having a plurality of individual mounting modules for receiving a MOSFET.
Figure 14:
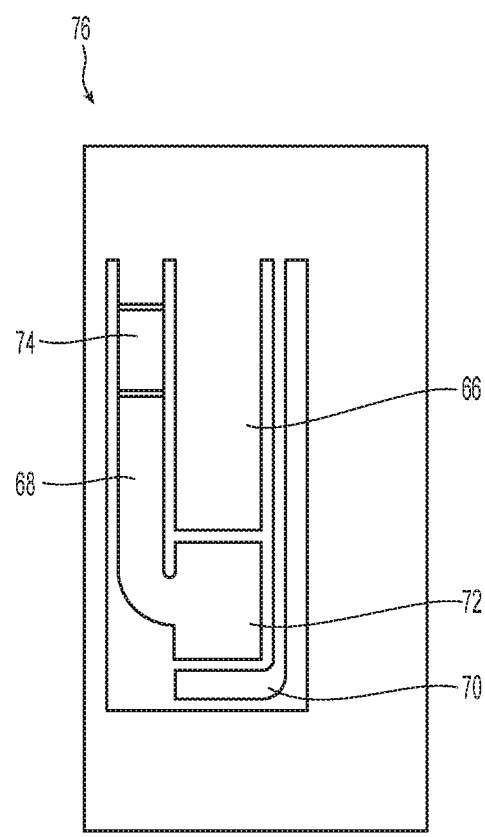
FIG. 14 is a top view of an individual lead frame for receiving a MOSFET.

FIGS. 13-25 illustrate one method for mounting a MOSFET within carrier 52. FIG. 13 illustrates a stamped sheet of electrically conductive material which will form the electrical leads for a plurality of MOSFETs. The sheet material used to form the lead frame depicted in FIG. 13 may be copper or other suitable electrically conductive material. FIG. 14 illustrates a single set of leads 76 from the sheet of material on which an individual MOSFET will be mounted.

Figure 15:
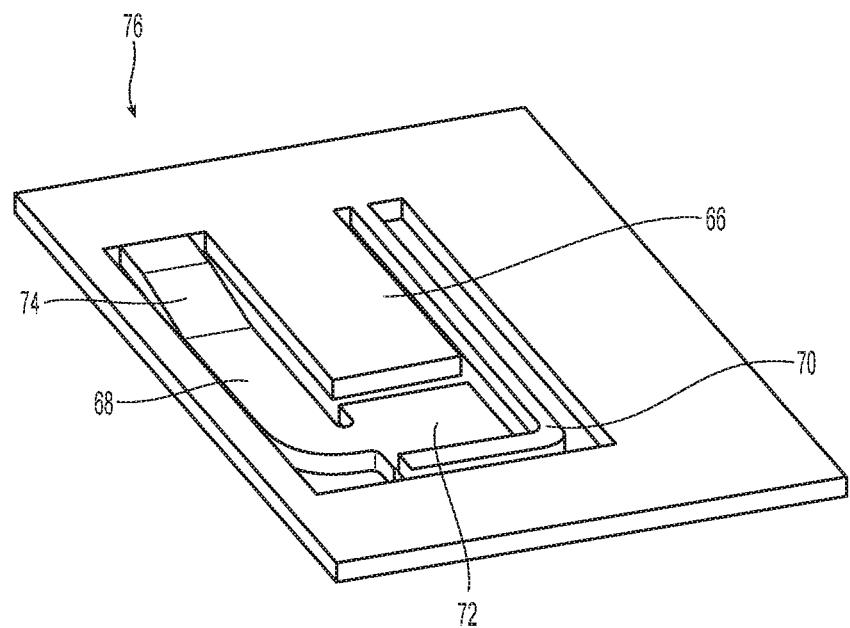
FIG. 15 is a perspective view showing an individual lead frame for receiving a MOSFET.
Figure 16:
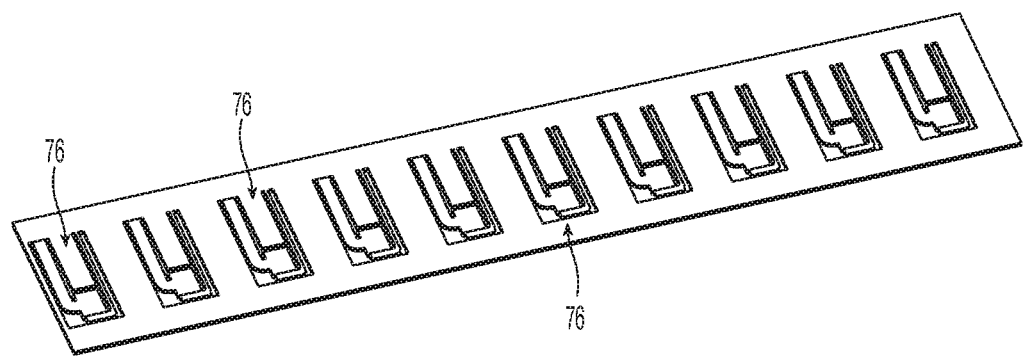
FIG. 16 is a perspective view of a lead frame having a plurality of individual mounting modules for receiving a MOSFET.

The individual lead frame 76 includes a source trace 66, a drain trace 68, a gate trace 70 and a mounting area 72. In the illustrated embodiment, the sheet of material, and all of the traces, is 0.6 mm thick while the source trace is 3.8 mm wide, the drain trace is 2 mm wide and the gate trace is 0.5 mm wide. Although the illustrated embodiment has such dimensions, alternative embodiments may have traces having alternative sizes and shapes. A bend 74 is formed in the drain trace 68 whereby the mounting area 72 is positioned out of the plane defined by the remainder of the sheet material. In the illustrated embodiment mounting area 72 is downset by the thickness of the gate material, i.e., 0.6 mm in the illustrated embodiment. Bend 74 is best understood with reference to the perspective view shown in FIG. 15. While FIGS. 14 and 15 show only a single set of gates, much of the processing of the lead frame can be most efficiently accomplished with the lead frame holding a plurality of gate arrangements. FIG. 16 depicts a lead frame sheet with a plurality of gate arrangements after forming bends 74.

Figure 17:
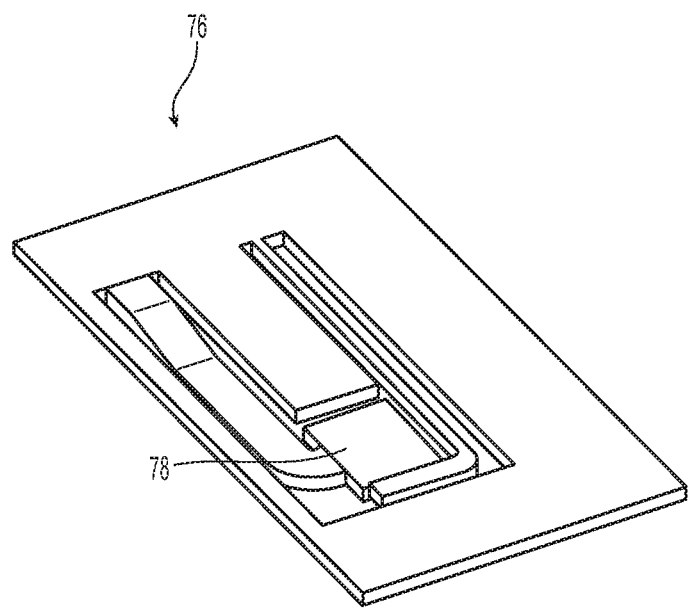
FIG. 17 is a perspective view showing an individual lead frame after solder has been applied to secure the MOSFET.
Figure 18:
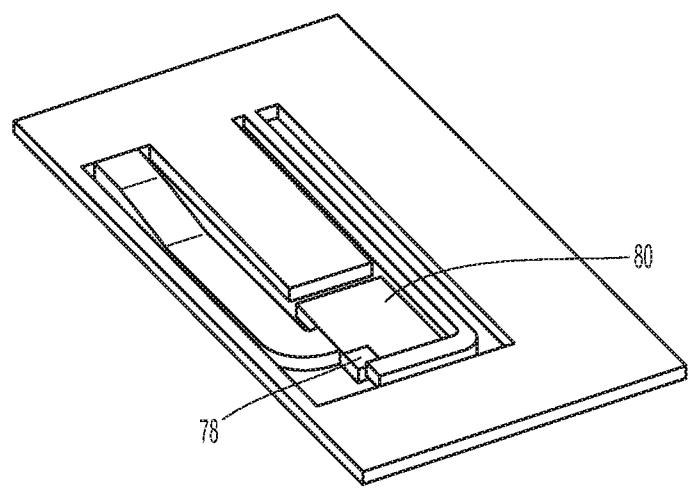
FIG. 18 is a perspective view showing an individual lead frame after the MOSFET has been mounted thereon.
Figure 19:
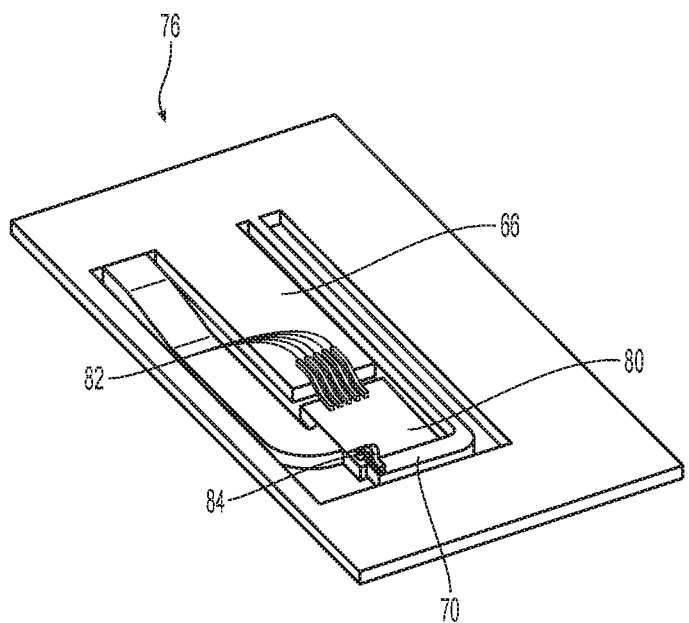
FIG. 19 is a perspective view showing an individual lead frame after adding wire bonds.

FIG. 17 illustrates a gate arrangement 76 after solder 78 has been applied to the mounting area 72. A MOSFET chip 80 is then positioned on top of solder 78 and solder 78 is heated to reflow solder 78 which then secures MOSFET 80 to mounting area 72 as depicted in FIG. 18. Solder 78 also conductively couples the bottom surface of MOSFET 80 and any electrical contacts thereon to drain trace 68. In the illustrated embodiment, a corner of the mounting area 72 with solder 78 applied thereto remains uncovered by MOSFET 80.

Figure 20:
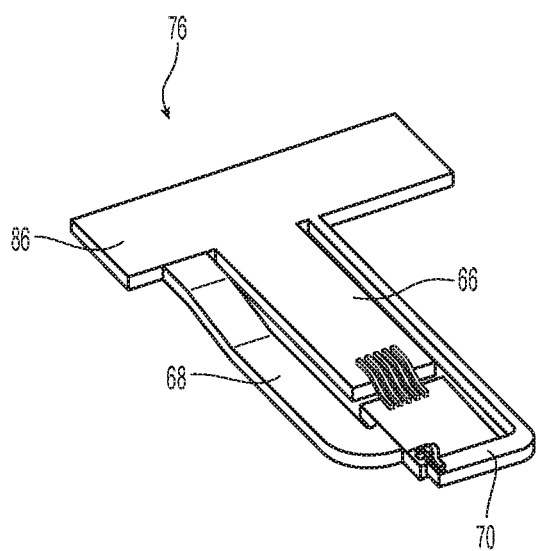
FIG. 20 is a perspective view showing an individual lead frame after partially trimming the lead frame.

Wire bonds 82, 84 are then added. Wire bonds 82 connect source trace 66 to MOSFET 80 while wire bond 84 connects gate trace 70 to MOSFET 80. Advantageously, a plurality of individual gate arrangements 76 remained secured together up to this point to facilitate efficient manufacture. After installing wire bonds 82, 84, the individual gate arrangements are separated and much of the sheet material is trimmed. As seen in FIG. 20, a section 86 of the sheet material connecting the projecting ends of traces 66, 68 and 70 is not trimmed away to facilitate the handing of the individual gate arrangement and MOSFET and installation thereof in a carrier 52.

Figure 21:
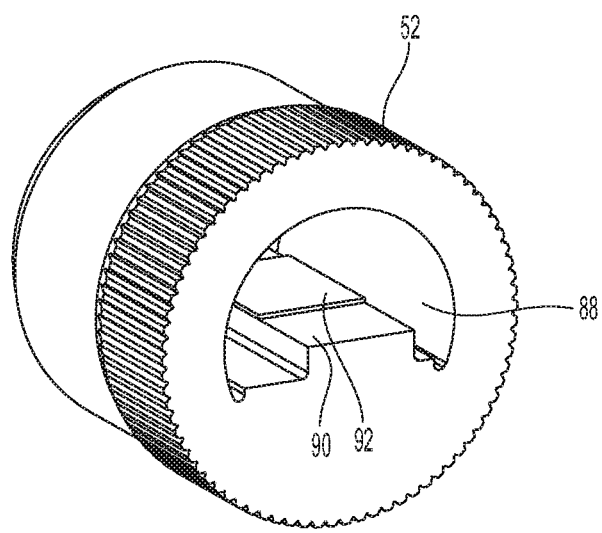
FIG. 21 is a perspective view showing the extrusion after solder has been applied thereto.
Figure 22:
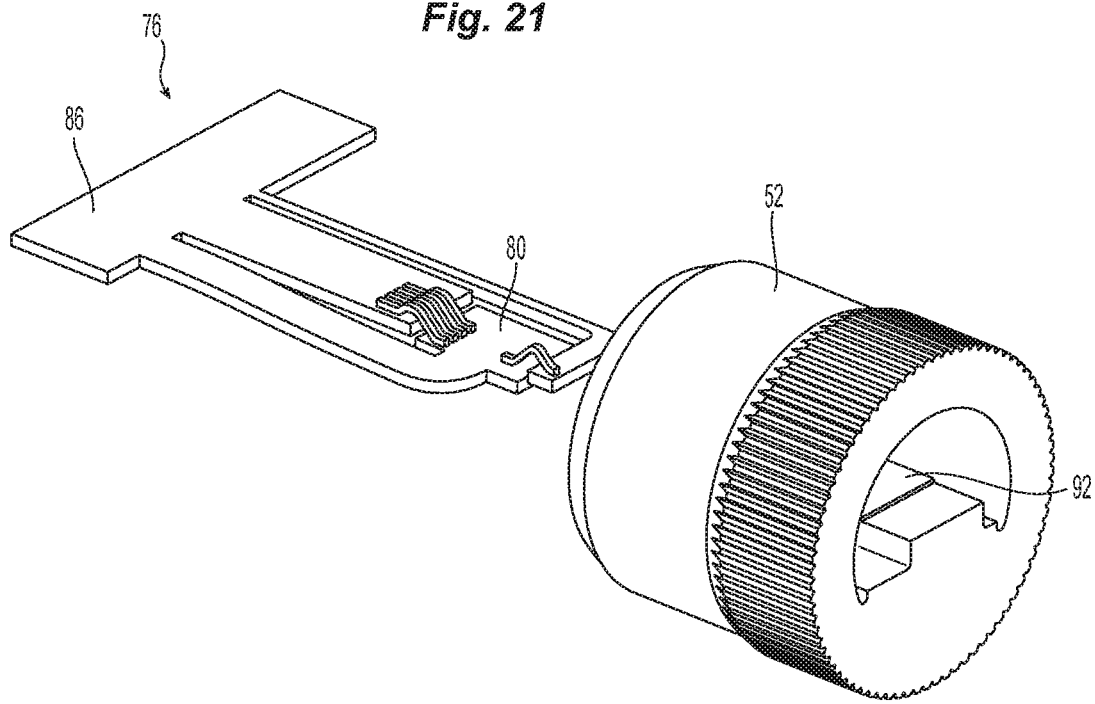
FIG. 22 is a perspective view showing the insertion of the bonded die into the carrier.

As discussed above, carrier 52 may be advantageously formed by cutting an extrusion to length. In the illustrated embodiment, the extrusion, and resulting carrier 52, define an interior space 88 that extends the full longitudinal length of carrier 52. Within interior space 88, carrier 52 defines at least one planar mounting surface 90 on which the MOSFET gate arrangement 76 can be mounted. To install the MOSFET gate arrangement 76 into a carrier 52, a layer of solder 92 is applied to planar surface 90 as shown in FIG. 21. The MOSFET assembly is then inserted into carrier 52 with the bottom side of mounting area 72 that is opposite MOSFET 80 being positioned on solder 92. The insertion of the MOSFET gate arrangement 76 into carrier 52 is depicted in FIG. 22.

Figure 23:
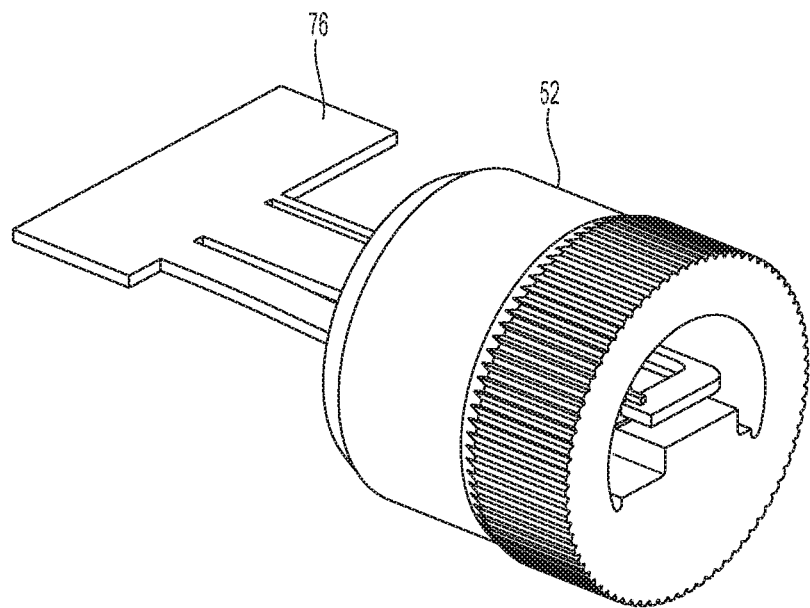
FIG. 23 is a perspective view of the carrier after reflowing the solder to attach the MOSFET to the carrier.
Figure 24:
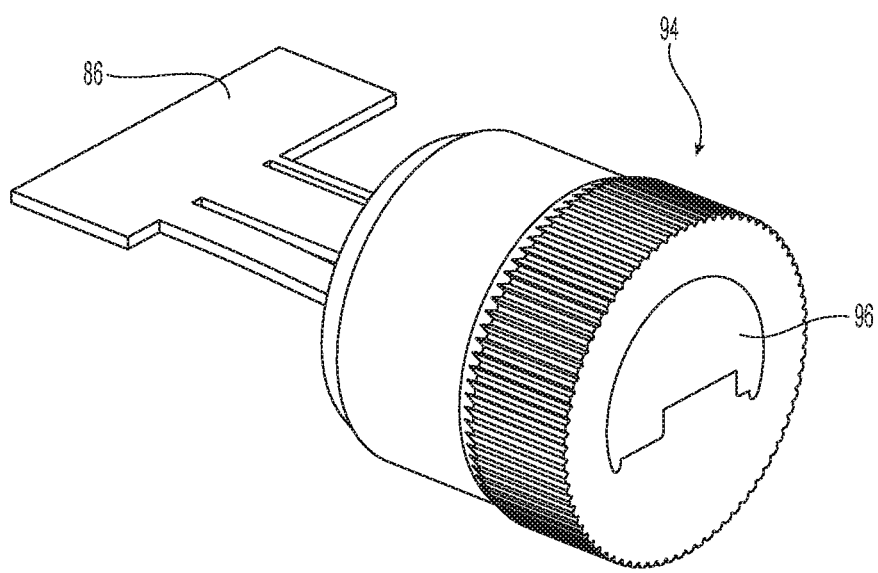
FIG. 24 is a perspective view of the carrier after a molding compound has been molded therein.
Figure 25:
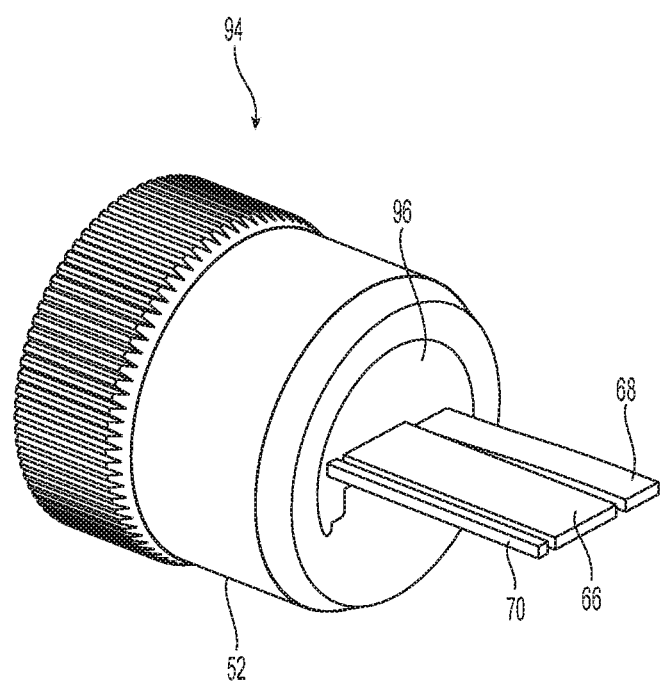
FIG. 25 is a perspective view of the MOSFET assembly after trimming the leads.
Figure 26:
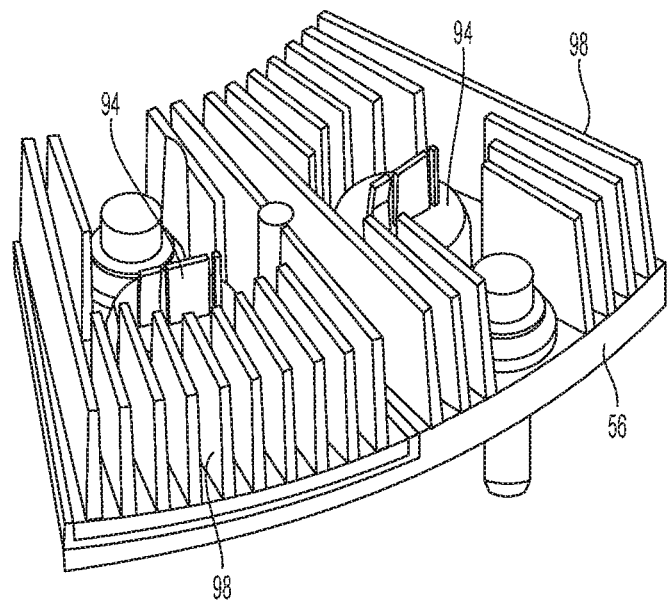
FIG. 26 is a perspective view of two MOSFET assemblies mounted on heat exchange members.
Figure 28:
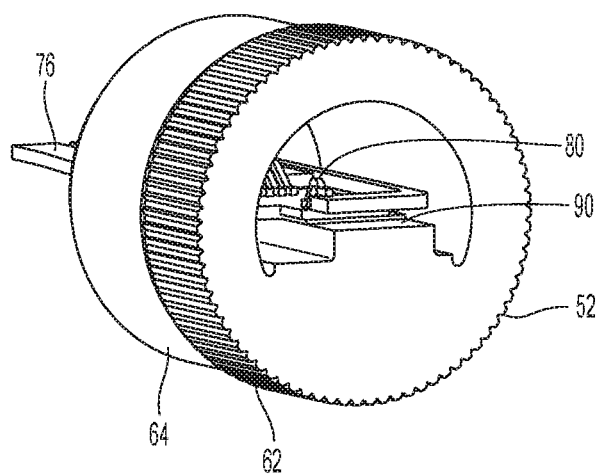
FIG. 28 is a perspective view of a MOSFET assembly

Solder 92 is then reflowed and allowed to cool to thereby mount gate arrangement 76 within carrier 52. The use of solder 92 also provides an electrical connection between drain trace 68 and carrier 52. FIG. 23 depicts the MOSFET assembly 94 after securement of the MOSFET gate arrangement 76 in carrier 52. A molding compound 96 is then used to fill the remainder of interior space 88 as depicted in FIG. 24. A phenolic molding compound is used in the illustrated embodiment, however, other appropriate materials may alternatively be employed. The connecting section 86 is then removed and the leads formed by gates 66 and 70 are trimmed to their desired lengths to form a finished MOSFET assembly 94 as shown in FIG. 25. FIG. 28 shows a carrier 52 with a MOSFET gate arrangement 76 mounted therein with trimmed leads but without showing the molding compound that fills interior space 88.

The MOSFET assembly 94 can then be press-fit into a housing member 56 for installation in electric machine 20. In the illustrated embodiment, housing member 56 is a heat exchange member that includes a plurality of heat exchange fins 98 for dissipating heat to the surrounding environment. MOSFET 80 generates significant heat and mounting MOSFET assembly 94 in a housing member 56 having heat exchange fins facilitates the efficient dispersal of the heat generated by MOSFET 80. In the illustrated embodiment, carrier 52 is copper and housing member 56 and fins 98 are formed out of aluminum to thereby form an efficient thermal pathway to dissipate the heat generated by MOSFET 80.

The use of robust carrier 52 provides several advantages. One of the advantages relates to the use of wire bonds 82, 84 coupling the conductive traces of gate arrangement 76 with MOSFET 80. As described above, wire bonds 82, 84 can be formed prior to mounting gate arrangement 76 and MOSFET 80 on mounting surface 90. These wire bonds can be more easily formed before mounting the MOSFET 80 and gate arrangement 76 on surface 90 than after mounting them on surface 90. Moreover, because the mounting interface of the MOSFET 80/gate arrangement 76 on surface 90 is isolated or distanced from the stresses that occur when press fitting carrier 52 into housing member 56, the wire bonds 82, 84 are not stressed during this installation. This arrangement thereby provides two significant advantages, one, it allows the wire bonds to be formed before mounting the MOSFET 80/gate arrangement 76 on the carrier and, two, it protects the wire bonds from stresses during installation of the carrier in the electric machine and also during subsequent use of the electric machine. By this reduction of stresses imparted to the wire bonds, the robustness of the MOSFET assembly is enhanced by carrier 52.

Figure 27:
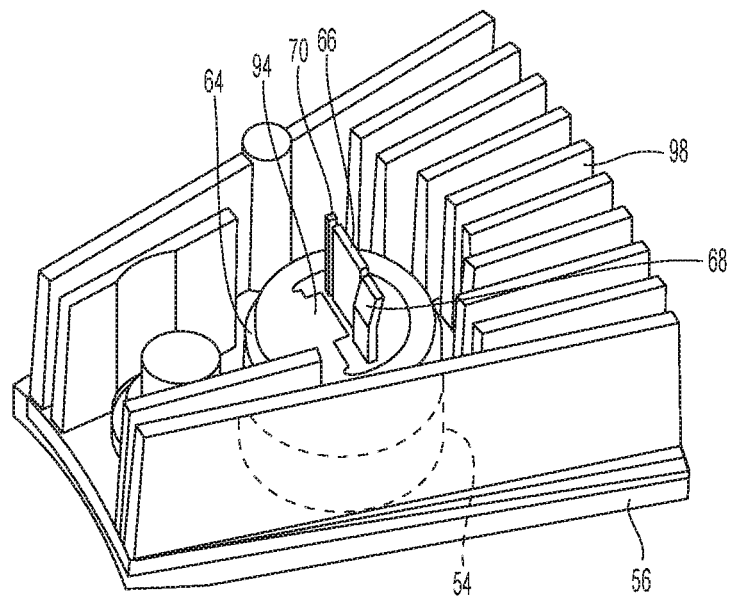
FIG. 27 is a perspective view of an individual MOSFET assembly mounted on a heat exchange member.

As shown in FIG. 27, a significant portion of carrier 52 which defines the connector plug surface 64 projects outwardly from housing member 56 and provides an interface for receiving a conventional electrical plug that surrounds and securely engages surface 64. The electrical plug also includes electrical connectors for conductively engaging the projecting traces 66, 68, 70 which function as electrical leads. The illustrated embodiment is an electric machine having six stator windings and the source, drain and gate traces are connected to form the circuit depicted in FIG. 9 and thereby operably couple the MOSFET assemblies 94 with stator assembly 22. Bus bar assembly 36 is conductively coupled with MOSFET assemblies 94 in the assembly of electric machine 20. Bus bar assembly 36 can be configured such that it provides a connection for traces 66, 68, 70 of each MOSFET assembly 94 or only some of the connections. For example, gate trace 70 might be connected with a controller 40 via an electrical connection that is separate and distinct from bus bar assembly 36. It is additionally noted that the coupling of the traces to bus bar 36 may be accomplished by a connection plug that is mounted on surface 64 or by extending a trace a sufficient distance whereby the projecting trace is engaged by one of the connectors 1-12 on bus bar assembly 36. The plug mounted on surface 64 may also include a projecting, electrically conductive stem, that is engageable by one of the connectors 1-12 located on bus bar assembly 36.

As mentioned above, the configuration of carrier 52 with its external ribs 62 and interior planar mounting surface 90 which is relatively isolated from the external cylindrical ring of carrier 52 allows carrier 52 to be press-fit into cylindrical opening 54 in housing member 56 without stressing the mechanical interfaces between MOSFET 80 and carrier 52 that are formed by the solder 92 on mounting surface 90 and solder layer 78 between MOSFET 80 and gate arrangement 76 and without stressing wire bonds 82, 84. This greatly reduces a potential failure pathway during the press-fit installation of the MOSFET assembly 94, i.e., the failure of a mechanical connection between MOSFET 80 and carrier 52 or a failure of a wire bond coupled with the MOSFET 80.

It is noted that in the illustrated embodiment, carrier 52 defines a ribbed, substantially cylindrical exterior surface whereby carrier 52 can be press fit into a cylindrical opening 54. It is not necessary, however, for carrier 52 and opening 54 to be cylindrical. Alternative carriers having an exterior with a non-cylindrical shape that allows the carrier to be secured within an opening defined by a housing member with a press-fit engagement may also be used. For example, a shape that requires the carrier to be oriented in a particular arrangement in the opening could be employed to thereby control the orientation of the carrier, and thus the projecting traces, relative to the housing member.

While this invention has been described as having an exemplary design, the present invention may be further modified within the spirit and scope of this disclosure. This application is therefore intended to cover any variations, uses, or adaptations of the invention using its general principles.

What is claimed is:

1. A method of manufacturing an electric machine comprising:
   operably coupling a stator assembly with a rotor assembly;
   coupling the stator assembly and the rotor assembly with a housing assembly;
   forming an opening in the housing assembly;
   forming a carrier, the carrier being formed out of a profile wherein the carrier defines a longitudinal axis and an interior space extending the longitudinal length of the carrier and wherein the interior space includes a planar mounting surface;
   mounting a MOSFET on the planar mounting surface of the carrier;
   installing the carrier in the opening in the housing assembly with a press-fit engagement; and
   operably coupling the MOSFET with the electric machine.

2. The method of claim 1 wherein the electric machine includes a plurality of carriers installed in a plurality of openings in the housing assembly and the profile is formed by extruding a material and wherein the method further includes the step of cutting the profile to a desired length to form the plurality of carriers.

3. The method of claim 1 wherein the electric machine includes a plurality of carriers installed in a plurality of openings in the housing assembly and the profile is formed by extruding a copper material and wherein the method further includes the step of cutting the profile to a desired length to form the plurality of carriers.

4. The method of claim 1 wherein the carrier is formed of a copper material.

5. The method of claim 1 further comprising coupling the MOSFET with a gate arrangement prior to mounting the MOSFET on the planar mounting surface.

6. The method of claim 5 wherein coupling the MOSFET with the gate arrangement includes mounting the MOSFET on the gate arrangement and the method further includes securing the gate arrangement to the planar mounting surface of the carrier to thereby mount the MOSFET on the planar mounting surface.

7. The method of claim 6 wherein the step of coupling the MOSFET with the gate arrangement includes coupling the MOSFET with the gate arrangement with a plurality of wire bonds prior to securing the gate arrangement to the planar mounting surface of the carrier.

8. The method of claim 1 wherein the profile defines a cross sectional shape in a plane perpendicular to the longitudinal axis that remains substantially constant along the longitudinal length of the profile.

9. The method of claim 1 wherein the profile defines an exterior surface having longitudinally extending ribs and the step of installing the carrier in the opening in the housing assembly includes engaging the longitudinally extending ribs with the housing assembly to form the press-fit engagement.

10. The method of claim 1 wherein the housing assembly includes a heat exchange member defining a plurality of heat exchange fins and the opening in the housing assembly and the step of installing the carrier in the opening in the housing assembly includes installing the carrier in the heat exchange member.

11. The method of claim 10 wherein the carrier is formed out of copper and the heat exchange member is formed out of aluminum.

12. The method of claim 1 further comprising the step of installing a bus bar assembly on the electric machine and coupling the MOSFET with the bus bar assembly.

13. The method of claim 1 wherein the step of forming the opening in the housing assembly comprises forming a cylindrical opening.

14. A method of manufacturing an electric machine comprising:
   operably coupling a stator assembly with a rotor assembly, the rotor assembly defining a rotational axis;
   coupling the stator assembly and the rotor assembly with a housing assembly;
   forming a plurality of openings in the housing assembly;
   forming a plurality of carriers, each carrier being formed out of a profile wherein the carrier defines a longitudinal axis and an interior space extending the longitudinal length of the carrier and wherein the interior space includes a planar mounting surface disposed parallel with the longitudinal axis;
   providing a plurality of MOSFETs and mounting one of the plurality of MOSFETs on the planar mounting surface of each of the plurality of carriers;

installing each of the plurality of carriers in one of the plurality of openings in the housing assembly with a press-fit engagement wherein the longitudinal axis of each of the plurality of carriers is parallel with the rotational axis of the rotor assembly; and operably coupling the plurality of MOSFETs with the electric machine.

15. The method of claim 14 wherein the profile is formed by extruding a material and wherein the method further includes the step of cutting the profile to a desired length to form the plurality of carriers.

16. The method of claim 14, wherein for each MOSFET of the plurality of MOSFETs, the method further comprises coupling the MOSFET with a gate arrangement prior to mounting the MOSFET on the planar mounting surface of one of the plurality of carriers.

17. A method of manufacturing an electric machine comprising:

operably coupling a stator assembly with a rotor assembly;

coupling the stator assembly and the rotor assembly with a housing assembly;

forming a plurality of openings in the housing assembly;

forming a profile by extruding a material, the profile defining a longitudinal axis and an interior space extending the longitudinal length of the profile and wherein the interior space includes a planar mounting surface;

cutting the profile to a desired length to form a plurality of carriers;

coupling each one of a plurality of MOSFETs with a gate arrangement of a corresponding plurality of gate arrangements;

mounting one of the plurality of MOSFETs on the planar mounting surface of each of the plurality of carriers after coupling the plurality of MOSFETs with the corresponding plurality of gate arrangements;

installing each of the plurality of carriers in a corresponding one of the plurality of openings in the housing assembly with a press-fit engagement; and operably coupling the plurality of MOSFETs with the electric machine.

18. The method of claim 17 wherein the profile is formed by extruding a copper material.

19. The method of claim 17 wherein coupling the plurality of MOSFETs with the corresponding plurality of gate arrangements includes, for each MOSFET of the plurality of MOSFETs, mounting the MOSFET on the gate arrangement and securing the gate arrangement to the planar mounting surface of one of the plurality of carriers to thereby mount the MOSFET on the planar mounting surface.

20. The method of claim 19 wherein the step of coupling the plurality of MOSFETs with the corresponding plurality of gate arrangements includes, for each MOSFET of the plurality of MOSFETs, coupling the MOSFET with the gate arrangement with a plurality of wire bonds prior to securing the gate arrangement to the planar mounting surface of one of the plurality of carriers.

* * * * *